(12) United States Patent
Kanehara

(10) Patent No.: US 9,299,136 B2
(45) Date of Patent: Mar. 29, 2016

(54) METAL ELEMENT DEFORMATION STATE DETECTION DEVICE

(71) Applicant: HONDA MOTOR CO., LTD., Tokyo (JP)

(72) Inventor: Shigeru Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/001,828

(22) PCT Filed: Dec. 27, 2012

(86) PCT No.: PCT/JP2012/083890
§ 371 (c)(1),
(2) Date: Aug. 27, 2013

(87) PCT Pub. No.: WO2014/102967
PCT Pub. Date: Jul. 3, 2014

(65) Prior Publication Data
US 2015/0294446 A1      Oct. 15, 2015

(51) Int. Cl.
*G06T 7/00* (2006.01)
*F16G 5/16* (2006.01)
*G01B 11/16* (2006.01)
*G01M 13/02* (2006.01)

(52) U.S. Cl.
CPC .............. *G06T 7/0004* (2013.01); *F16G 5/16* (2013.01); *G01B 11/16* (2013.01); *G01M 13/02* (2013.01)

(58) Field of Classification Search
CPC ......... F16G 5/16; G01B 11/16; G01M 13/02; G06T 7/0004

USPC .......................................................... 348/125
See application file for complete search history.

(56) References Cited

U.S. PATENT DOCUMENTS

| | | | |
|---|---|---|---|
| 2007/0205414 A1* | 9/2007 | Chang et al. | 257/69 |
| 2007/0242990 A1* | 10/2007 | Ohhara et al. | 399/329 |
| 2010/0267188 A1* | 10/2010 | Parks et al. | 438/87 |
| 2011/0093218 A1 | 4/2011 | Vozner | |

FOREIGN PATENT DOCUMENTS

| | | |
|---|---|---|
| EP | 1939487 A1 | 7/2008 |
| JP | 2002-048681 A | 2/2002 |

(Continued)

OTHER PUBLICATIONS

Office Communication dated May 7, 2015, issued in corresponding Netherlandish Patent Application No. 2011419 (7 pages).

(Continued)

*Primary Examiner* — Shan Elahi
(74) *Attorney, Agent, or Firm* — Westerman, Hattori, Daniels & Adrian, LLP

(57) ABSTRACT

A metal element deformation state detection device is provided in which since a plurality of the metal elements are in line contact with each other via a rocking edge and are aligned in an arc shape to form a metal element row, a light source is disposed on the radially inner side or the radially outer side of the arc of the metal element row, and a deformation state of the metal element is detected by observing passed-through light that has been emitted from the light source and has passed through a gap between adjacent metal elements, slight deformation in the metal element can reliably be detected.

8 Claims, 9 Drawing Sheets

(56) References Cited

FOREIGN PATENT DOCUMENTS

| JP | 2004-337743 A | 12/2004 |
|----|---------------|---------|
| JP | 3641989 B2 | 4/2005 |
| JP | 2006-097847 A | 4/2006 |
| JP | 2006-132942 A | 5/2006 |
| JP | 2008-170430 A | 7/2008 |

OTHER PUBLICATIONS

International Search Report of PCT/JP2012/083890, mailing date of Feb. 26, 2013.

* cited by examiner

FIG.1
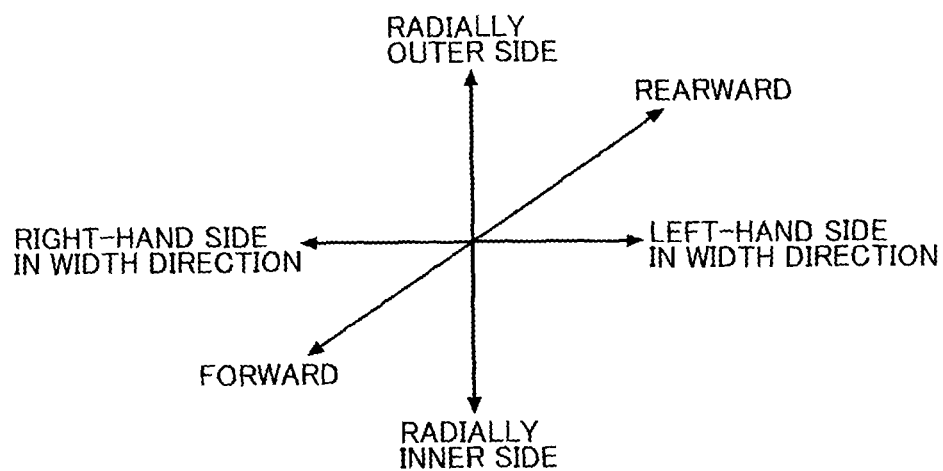
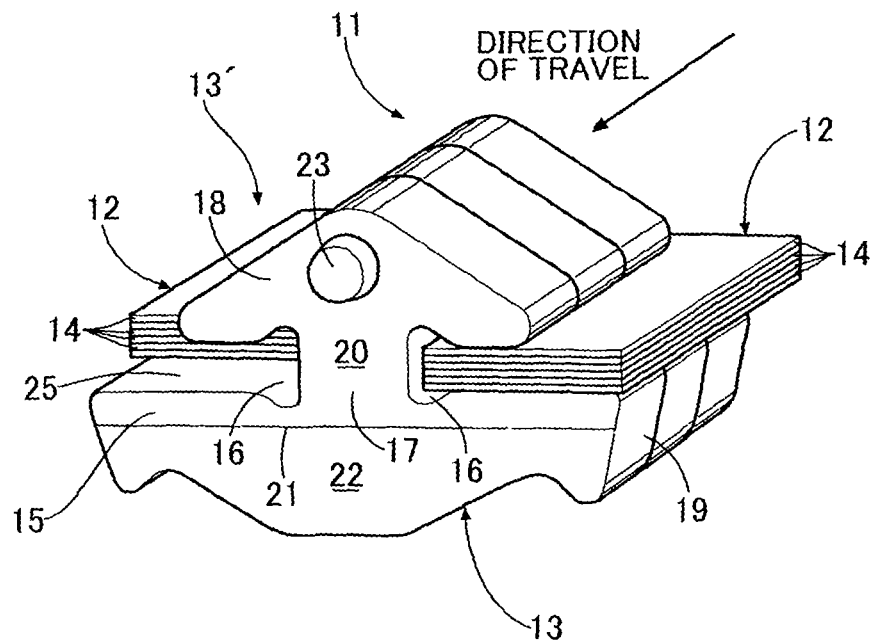

METAL ELEMENT DEFORMATION STATE DETECTION DEVICE

TECHNICAL FIELD

The present invention relates to a metal element deformation state detection device for detecting a deformation state of a metal element forming a metal belt for a belt type continuously variable transmission.

BACKGROUND ART

An arrangement in which, in a state in which a metal belt for a belt type continuously variable transmission having a large number of metal elements supported on a pair of metal ring assemblies (bands) is wound around a pair of pulleys, an image is taken by imaging means from a plurality of directions, and the direction of assembly of the metal belt is determined based on the direction of a step (rocking edge) of the metal elements determined from the image or the type of metal belt is determined based on the width of the metal element itself or the width of a band groove of the metal element is known from Patent Document 1 below.

RELATED ART DOCUMENTS

Patent Documents

Patent Document 1: Japanese Patent No. 3641989

SUMMARY OF INVENTION

Problems to be Solved by the Invention

Metal elements forming a metal belt are components that are required to have high dimensional precision, but there is a possibility of slight deformation (bending, warping, flexure) occurring when for example carrying out a heat treatment during a production step, and if such a deformed metal element is mistakenly assembled to form a metal belt, since slip occurs between contacting faces of the metal element and a pulley during operation, there are the problems that it causes abnormal wear of the pulley and it causes the generation of heat to thus degrade transmission efficiency.

The reason why slip occurs between the contacting faces of the metal element and the pulley during operation is as follows. A large number of metal elements forming a metal belt are put into intimate contact with each other by means of a pressing force to thus transmit a driving force; if a deformed metal element is included in the metal belt, a gap is formed between the deformed metal element and a metal element adjacent thereto, and the size of the gap decreases as the pressing force increases.

For example, in a driven pulley, the pressing force becomes a maximum at a position where the metal belt bites into a V groove and gradually decreases therefrom, and the pressing force becomes zero at a position where the metal belt disengages from the V groove. In this way, when the pressing force changes within a region where the metal belt is wound around the pulley, since the size of the gaps occurring before and after the deformed metal element change, a relative speed therefore occurs between adjacent metal elements. Even when the peripheral speed of the pulley and the peripheral speed of the metal belt are the same, if a relative speed occurs between the metal elements, the relative speed causes the metal elements to slip relative to the V groove.

The arrangement described in Patent Document 1 above determines the shape, etc. of a metal element based on an area that appears as white due to its ease of reflecting light and an area that appears as black due to its difficulty in reflecting light; it is therefore possible to detect an approximate shape such as the orientation of the metal element, but it is difficult to detect a state of slight deformation that has occurred in the metal element.

The present invention has been accomplished in light of the above circumstances, and it is an object thereof to detect a deformation state of a metal element of a metal belt for a belt type continuously variable transmission with good precision.

MEANS FOR SOLVING THE PROBLEMS

In order to attain the above object, according to a first aspect of the present invention, there is provided a metal element deformation state detection device for detecting a deformation state of a metal element forming a metal belt for a belt type continuously variable transmission, wherein a plurality of the metal elements are in line contact with each other via a rocking edge and are aligned in an arc shape to form a metal element row, a light source is disposed on a radially inner side or a radially outer side of the arc of the metal element row, and a deformation state of the metal element is detected by observing passed-through light that has been emitted from the light source and has passed through a gap between the adjacent metal elements.

Further, according to a second aspect of the present invention, in addition to the first aspect, the device further comprises imaging means disposed on the opposite side of the metal element row to the light source so that the metal element row is interposed therebetween, and an image analyzer that analyzes an image of the passed-through light taken by the imaging means.

Furthermore, according to a third aspect of the present invention, in addition to the second aspect, the image analyzer detects a deformation state of the metal element based on the shape of an image of the passed-through light.

Moreover, according to a fourth aspect of the present invention, in addition to the second aspect, the image analyzer detects a deformation state of the metal element based on an average illumination intensity of an image taken by the imaging means.

Further, according to a fifth aspect of the present invention, in addition to any one of the second to fourth aspects, an image of the passed-through light is taken by the imaging means while moving the metal element row wound around an outer periphery of a dummy pulley.

Furthermore, according to a sixth aspect of the present invention, in addition to any one of the first to fifth aspects, the metal element row is formed by assembling a plurality of metal elements on a pair of metal ring assemblies.

Moreover, according to a seventh aspect of the present invention, in addition to the sixth aspect, a deformation state of the metal element is detected while moving the metal element row within a horizontal plane.

Further, according to an eighth aspect of the present invention, in addition to any one of the first to seventh aspects, a deformation state of the metal element is detected while moving a plurality of the metal element rows arranged side by side.

EFFECTS OF THE INVENTION

In accordance with the first aspect of the present invention, the plurality of metal elements are in line contact with each other via the rocking edge and are aligned in an arc shape to form a metal element row that, the light source is disposed on the radially inner side or the radially outer side of the arc of the metal element row, and a deformation state of the metal element is detected by observing passed-through light that has been emitted from the light source and has passed through a gap between adjacent metal elements, therefore making it possible to reliably detect slight deformation of the metal element. Furthermore, if an attempt were to be made to observe passed-through light that had passed through a gap formed between parts that are in face contact with each other, depending on the observation angle observation might be impossible due to the passed-through light being blocked, but observing passed-through light that has passed through a gap formed between the rocking edges, which are in line contact with each other, of the adjacent metal elements makes it difficult for passed-through light to be blocked, thus improving the precision of detection.

Furthermore, in accordance with the second aspect of the present invention, since it includes the imaging means disposed on the opposite side of the metal element row to the light source so that the metal element row is interposed therebetween, and the image analyzer for analyzing an image of passed-through light taken by the imaging means, it is possible to accurately determine the size of a gap from the image of passed-through light, thus detecting the deformation state of the metal element with better precision.

Moreover, in accordance with the third aspect of the present invention, since the image analyzer detects the deformation state of a metal element based on the shape of the image of passed-through light, it is possible to determine the size of the gap more accurately, thus reliably identifying a curved metal element within a metal element row.

Furthermore, in accordance with the fourth aspect of the present invention, since the image analyzer detects the deformation state of a metal element based on the average illumination intensity of an image taken by the imaging means, it is possible to efficiently identify a section that includes a curved metal element within a metal element row without determining the deformation state of individual metal elements.

Moreover, in accordance with the fifth aspect of the present invention, since an image of passed-through light is taken by the imaging means while moving the metal element row wound around the outer periphery of the dummy pulley, it becomes possible to carry out a test in a state in which the metal element row is aligned in an arc shape having a constant curvature and the rocking edges are reliably put into line contact with each other, thus further improving the precision of detection. Furthermore, since a large number of metal elements can be tested without adding to the light source or the imaging means, the equipment cost can also be reduced.

Moreover, in accordance with the sixth aspect of the present invention, since the metal element row is formed by assembling a plurality of metal elements on the metal ring assembly, not only is it possible to enhance the work efficiency by integrating the plurality of metal elements so that they are not disassembled, it is also possible to enhance the reliability of the metal belt as a product since the final test can be carried out in a state in which the metal belt is completed.

Furthermore, in accordance with the seventh aspect of the present invention, since the deformation state of a metal element is detected while moving the metal element row within the horizontal plane, the pair of metal ring assemblies move downwardly by virtue of gravity, thus forming spaces through which light can pass without being blocked by the metal ring assemblies on the upper side of the lower metal ring assembly (inner side in width direction of metal element) and on the upper side of the upper metal ring assembly (outer side in width direction of metal element). This enables both a gap formed on the inner side in the width direction of the metal element and a gap formed on the outer side in the width direction of the metal element to be detected, thus further improving the precision of detection.

Moreover, in accordance with the eighth aspect of the present invention, since the deformation state of a metal element is detected while moving the plurality of metal element rows arranged side by side, it becomes possible to carry out testing of the plurality of metal element rows at the same time, and not only does the work efficiency increase, but it is also possible to cut the equipment cost by sharing one imaging means among the plurality of metal element rows.

BRIEF DESCRIPTION OF DRAWINGS

FIG. 1 is a partial perspective view of a metal belt. (first embodiment)

EXPLANATION OF REFERENCE NUMERALS AND SYMBOLS

Figure 2:
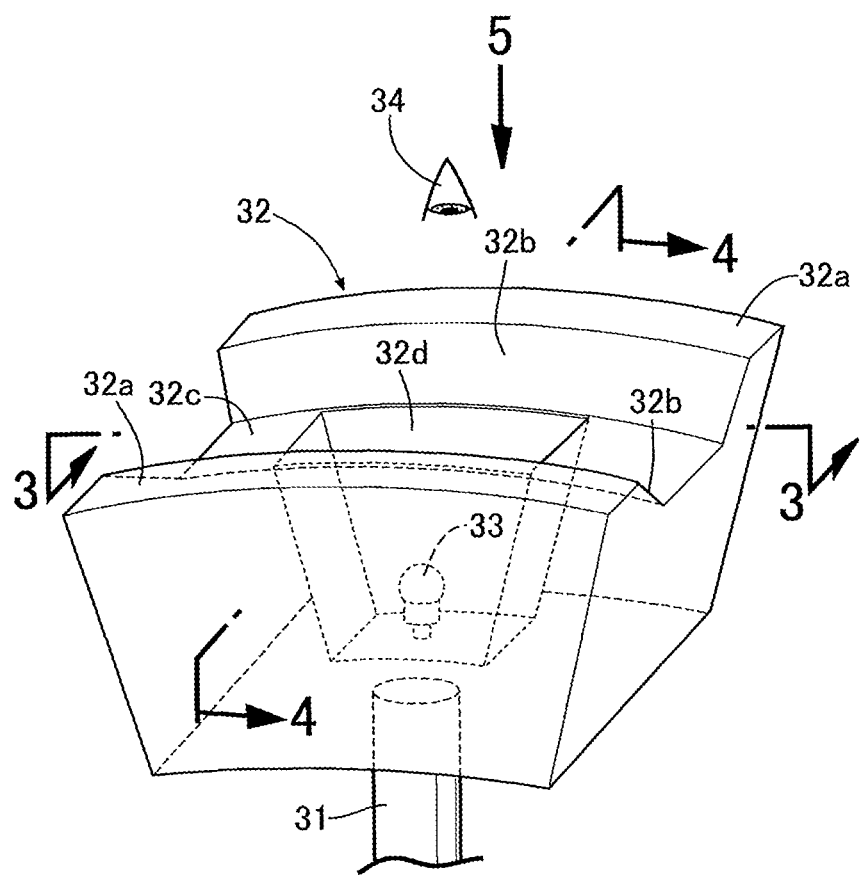
FIG. 2 is a perspective view of a metal element deformation state detection device. (first embodiment)

11 Metal belt
12 Metal ring assembly
13 Metal element
13' Metal element row
21 Rocking edge
32 Dummy pulley
33 Light source
35 Imaging means
36 Image analyzer

MODES FOR CARRYING OUT THE INVENTION

Modes for carrying out the present invention are explained below by reference to the attached drawings.

First Embodiment

A first embodiment of the present invention is now explained by reference to FIG. 1 to FIG. 5.

Definitions of the radial direction, the width direction, and the fore-and-aft direction of a metal element used in the present specification are as shown in FIG. 1. The radial direction is defined as a radial direction of a pulley against which the metal element abuts, the side closer to the shaft of the pulley being the radially inner side, and the side further from the shaft of the pulley being the radially outer side. The width direction is defined as a direction along the shaft of the pulley against which the metal element abuts, and the fore-and-aft direction is defined as a direction along the direction of movement of the metal element.

As shown in FIG. 1, a metal belt 11 for a belt type continuously variable transmission is one in which a large number of metal elements 13 are supported on a left and right pair of metal ring assemblies 12 and 12, each metal ring assembly 12 being formed by layering a plurality of metal rings 14. The large number of metal elements 13, which are layered so as to be endless, form a metal element row 13'.

The metal element 13, which is formed by stamping a metal plate material, includes an element main body 15, a neck part 17 positioned between a left and right pair of ring slots 16 and 16 with which the metal ring assemblies 12 and 12 engage, and a substantially triangular ear part 18 connected to the radially outer side of the element main body 15 via the neck part 17. A pair of pulley abutment faces 19 and 19 that can abut against a V groove of the pulley are formed on opposite end parts in the left-and-right direction of the element main body 15. Furthermore, main faces 20 and 20 that abut against each other are formed on the front side and the rear side in the direction of travel of the metal element 13. Moreover, an inclined face 22 is formed on the radially inner side of the main face 20 on the front side in the direction of travel via a rocking edge 21 extending in the width direction. Furthermore, in order to join metal elements 13 and 13 that are adjacent to each other in the fore-and-aft direction, a projection 23 and a recess 24 (see FIG. 5 and FIG. 7), which can be mated with each other, are formed on front and rear faces of the ear part 18. Saddle faces 25 and 25 for supporting inner peripheral faces of the metal ring assemblies 12 and 12 are formed on the inner edge in the radial direction of the pair of ring slots 16 and 16.

Figure 3:
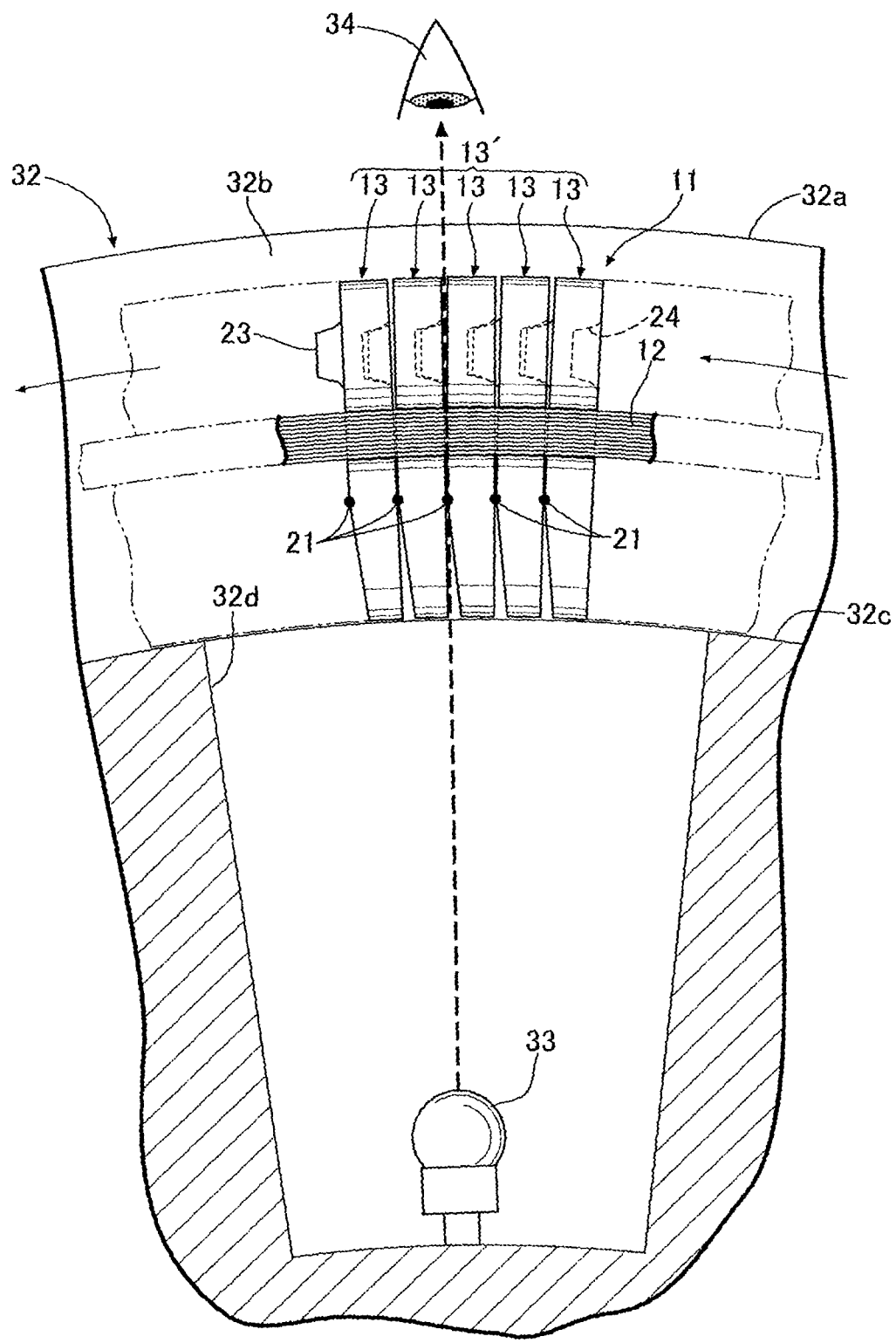
FIG. 3 is a sectional view along line 3-3 in FIG. 2. (first embodiment)
Figure 4:
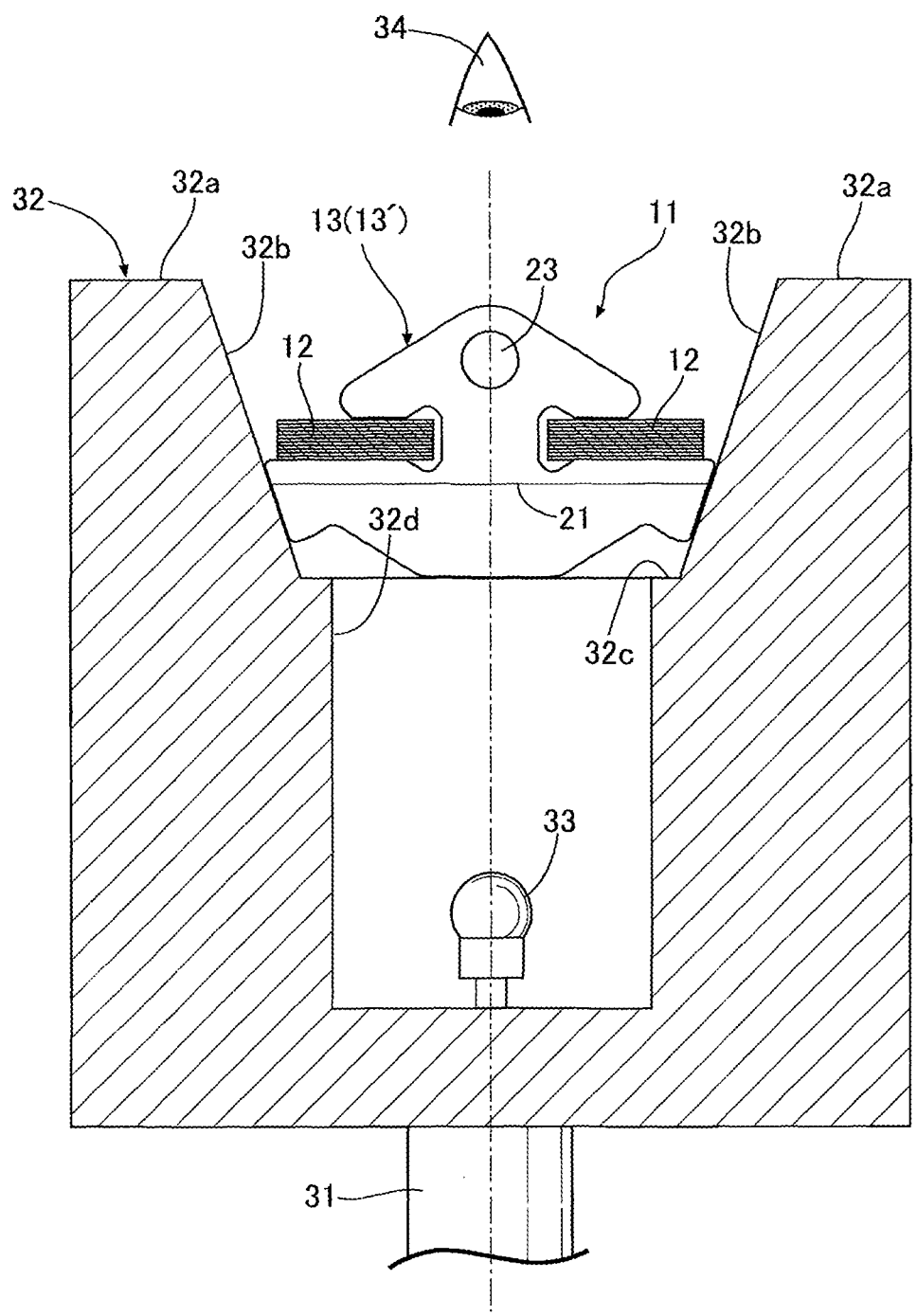
FIG. 4 is a sectional view along line 4-4 in FIG. 2. (first embodiment)

As shown in FIG. 2 to FIG. 4, a deformation state detection device for the metal elements 13 includes a dummy pulley 32 supported at the tip of a stay 31 fixed to any fixing part. The dummy pulley 32 of the present embodiment has a shape formed by cutting out a fan shape from a predetermined range in the circumferential direction of a pulley, and a V groove 32b is formed in an arc-shaped outer peripheral face 32a positioned in an upper part of the shape. A light source 33 is disposed within a space 32d extending inwardly in the radial direction and downwardly from a bottom wall 32c of the V groove 32b. The angle of the V groove 32b coincides with an angle formed by the pair of pulley abutment faces 19 and 19 of the metal elements 13 of the metal element row 13', and the metal element row 13' can therefore smoothly slide along the V groove 32b of the dummy pulley 32.

The operation of the first embodiment the present invention having the above arrangement is now explained.

While fitting the metal element row 13' into the V groove 32b of the dummy pulley 32 and slowly sliding it in a state in which the light source 33 disposed within the space 32d of the dummy pulley 32 is turned on, an operator positions an eye 34 above the space 32d to observe light from the light source 33. Since the V groove 32b of the dummy pulley 32 is curved into an arc shape, the metal elements 13 forming the metal element row 13' are aligned into an arc shape having a constant curvature, and each metal element 13 is reliably in line contact with the adjacent metal element 13 via the rocking edge 21 (see FIG. 4). Therefore, unless the metal element 13 is deformed, no gap occurs at the rocking edge 21, and light from the light source 33 is therefore blocked and does not reach the operator's eye 34.

Figure 5:
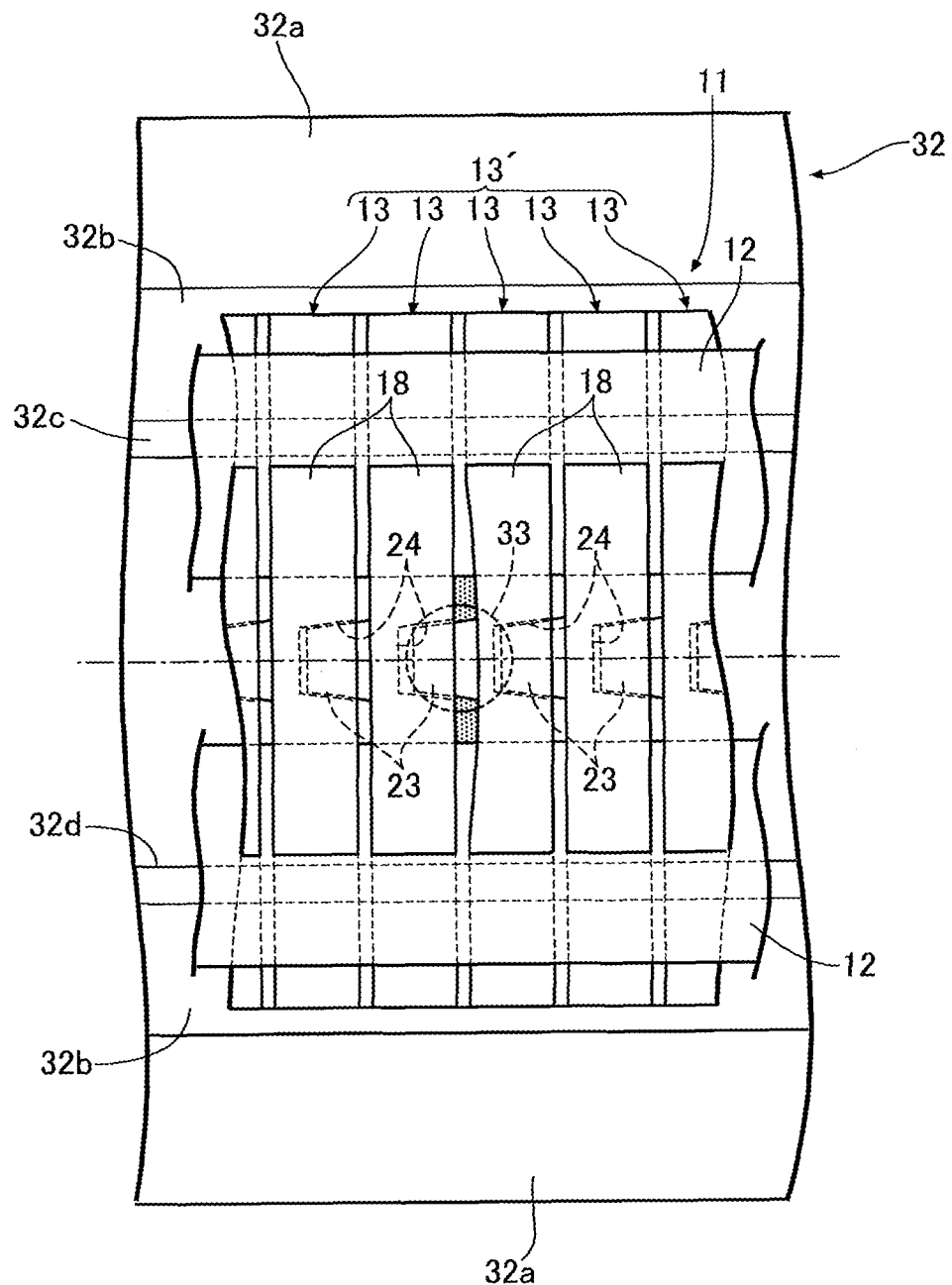
FIG. 5 is a view in the direction of arrow 5 in FIG. 2. (first embodiment)

However, when the metal element 13 is deformed, a gap occurs at the rocking edge 21, and light from the light source 33 passes through the gap. As shown in FIG. 5, part of the light passing through the gap is blocked by the pair of metal ring assemblies 12 and 12 and the projection 23 of the metal element 13, but light that is not blocked by the metal ring assemblies 12 and 12 or the projection 23 reaches the operator's eye 34, and the operator can reliably find the deformed metal element 13. The blackened area in the figure denotes a region where light passing through the gap reaches the operator's eye 34.

Furthermore, if the test were to be carried out in a state in which the metal element row 13' was aligned in a linear shape, in other words, if the test were to be carried out in a state in which the main faces 20 and 20 having a predetermined area of the metal elements 13 were put into face contact with each other, even if a gap were present due to deformation of a metal element 13, unless the direction of light from the light source 33 and the direction of the gap were completely coincident with each other, light could not pass through the gap, the operator could not observe the light, and there would be a possibility that deformation of the metal element 13 would not be found.

However, in accordance with the present embodiment, since the test is carried out in a state in which the metal element row 13' is curved into an arc shape and the rocking edge 21 of the metal element 13 is in line contact, light passing through a gap occurring at the rocking edge 21 can reach the operator's eye 34 without being blocked, a deformed metal element 13 can be reliably found, and a countermeasure such as replacement with a normal metal element 13 can be taken.

Furthermore, since the test is carried out in a state in which the metal element row 13' has a large number of metal elements 13 assembled on the metal ring assemblies 12 and 12, not only is it possible to enhance the work efficiency by integrating the plurality of metal elements 13 so that they are not disassembled, but it is also possible to enhance the reliability of the metal belt 11 as a product since the final test can be carried out in a state in which the metal belt 11 is completed.

Second Embodiment

A second embodiment of the present invention is now explained by reference to FIG. 6 and FIG. 7.

Figure 6:
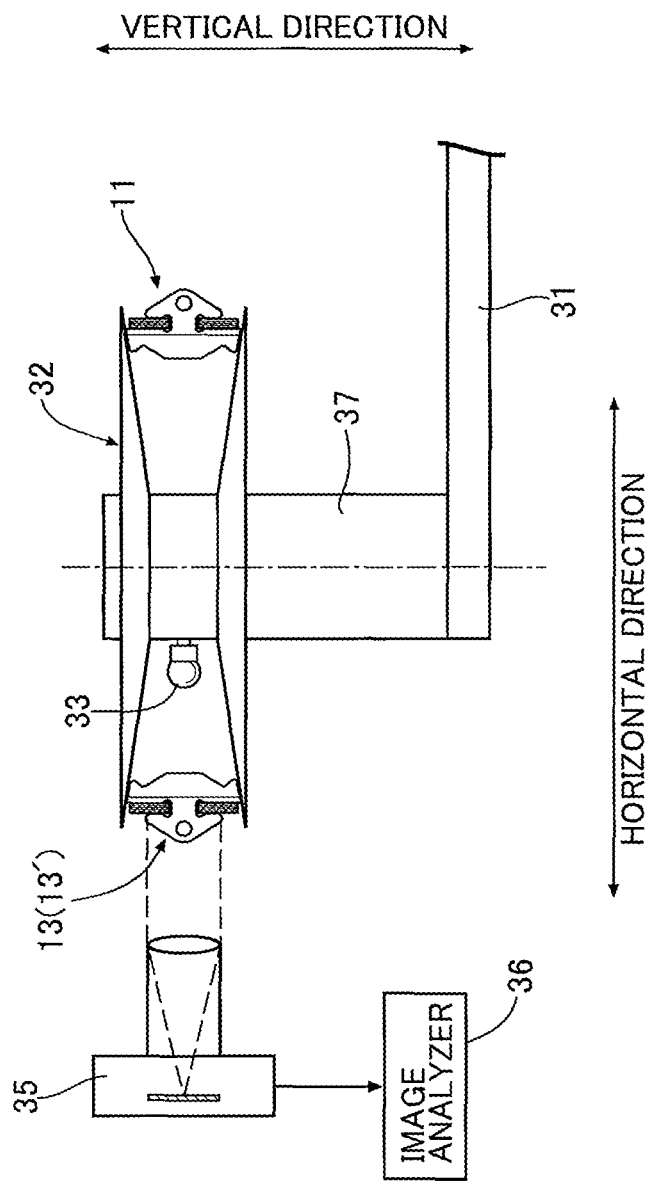
FIG. 6 is a side view of a metal element deformation state detection device. (second embodiment)

As shown in FIG. 2, in the first embodiment light leaking past the gap between the metal elements 13 is observed by eye, but as shown in FIG. 6 in the second embodiment light leaking past a gap between metal elements 13 is observed by taking an image by imaging means 35 such as a CCD camera.

A dummy pulley 32 of the second embodiment has a circular shape that is similar to an actual pulley, and is rotatably supported on a rotating shaft 37 vertically fixed to a stay 31. A light source 33 is fixed to the rotating shaft 37, and the imaging means 35 is disposed on the radially outer side of the dummy pulley 32 so as to be directed toward the light source 33. In a state in which a metal element row 13' is wound around a V groove 32b of the dummy pulley 32, while rotating the dummy pulley 32 through a predetermined angle (e.g. 10°) at a time, an image of the metal element row 13' is taken by the imaging means 35. An image analyzer 36 is connected to the imaging means 35. Furthermore, the rotating shaft 37 of the dummy pulley 32 is vertically disposed, and the row 13' of metal elements 13 move within a horizontal plane.

Figure 7:
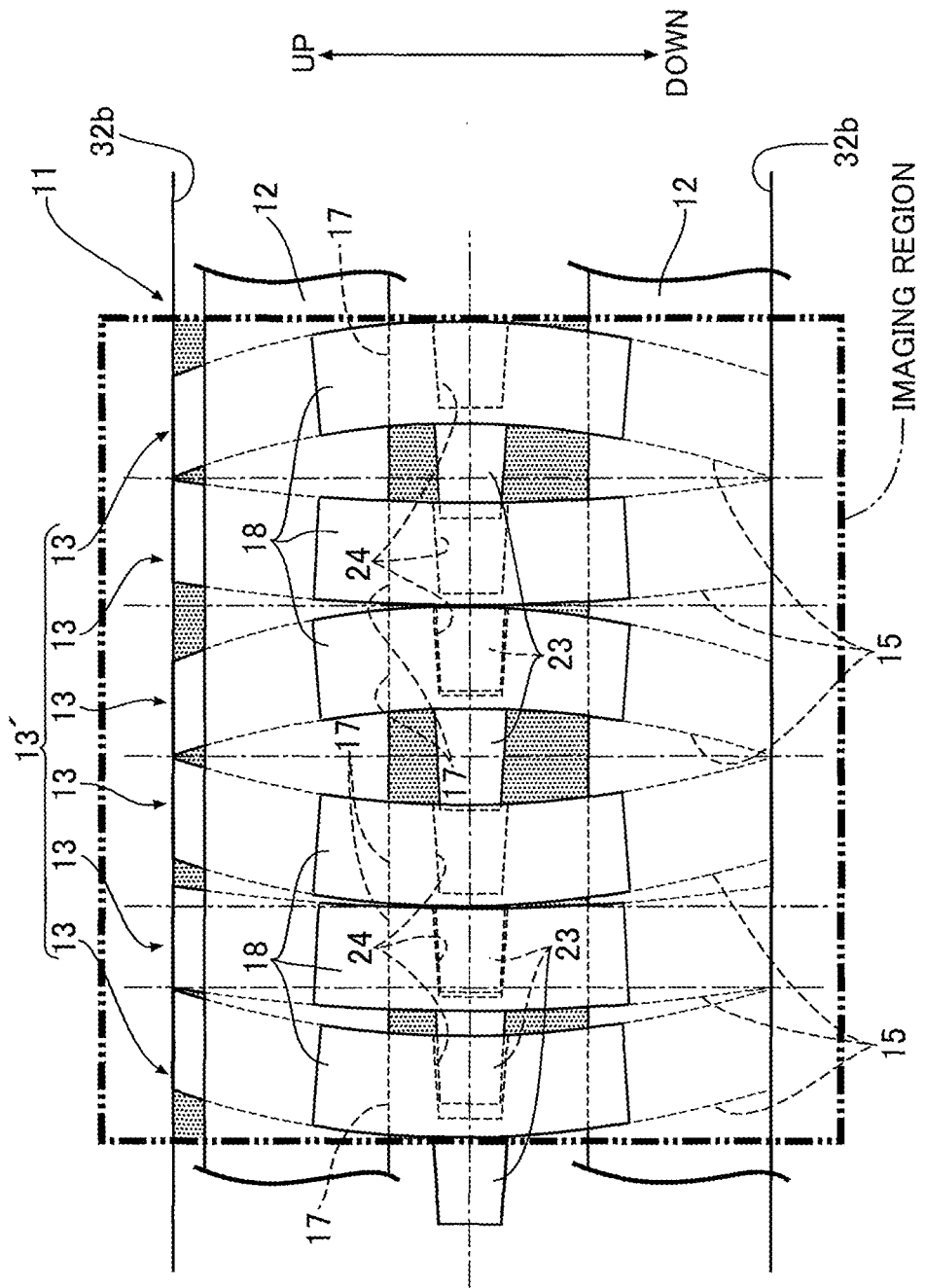
FIG. 7 is a schematic diagram of an image taken by imaging means. (second embodiment)

FIG. 7 schematically shows an image taken as described above. One image covers a region of for example six metal elements 13, and the blackened areas in the figure denote an image taken of light that has passed through a gap formed due to deformation of the metal elements 13. The image analyzer 36 calculates the shape (specifically, the area) of an individual image of light (blackened area in the figure) in the image taken by the imaging means 35, and since, when the area is a predetermined threshold value or greater, it is determined that a deformed metal element 13 is present, a countermeasure such as replacement of the deformed metal element 13 can be taken.

Alternatively, the image analyzer 36 calculates the average illumination intensity of an image taken by the imaging means 35, that is, the sum of the areas of images of light (blackened areas in the figure) relative to the total image area, and since, when the average illumination intensity is a predetermined threshold value or greater, it is determined that a deformed metal element 13 is included in the metal elements 13 in the image, that section is retested, and a countermeasure such as replacement of the deformed metal element 13 can be taken.

Furthermore, since in the present embodiment the rotating shaft 37 of the dummy pulley 32 is vertically disposed and the metal element row 13' moves within the horizontal plane, a pair of metal ring assemblies 12 and 12 of the metal element row 13' are urged downwardly (one side in the width direction of the metal element 13) by virtue of gravity. As a result, the metal ring assembly 12 on the upper side is biased toward the inner side in the width direction of the metal element 13 and abuts against a neck part 17, and the metal ring assembly 12 on the lower side is biased toward the outer side in the width direction of the metal element 13 and abuts against the V groove 32b of the dummy pulley 32. This enables a gap occurring on the outer side in the width direction of the metal element 13 to be reliably detected above the metal ring assembly 12 on the upper side, and a gap occurring on the inner side in the width direction of the metal elements 13 to be reliably detected above the metal ring assembly 12 on the lower side, thereby enabling a gap to be reliably detected even if the position of the gap changes according to the deformation state of the metal elements 13.

Third Embodiment

Figure 8:
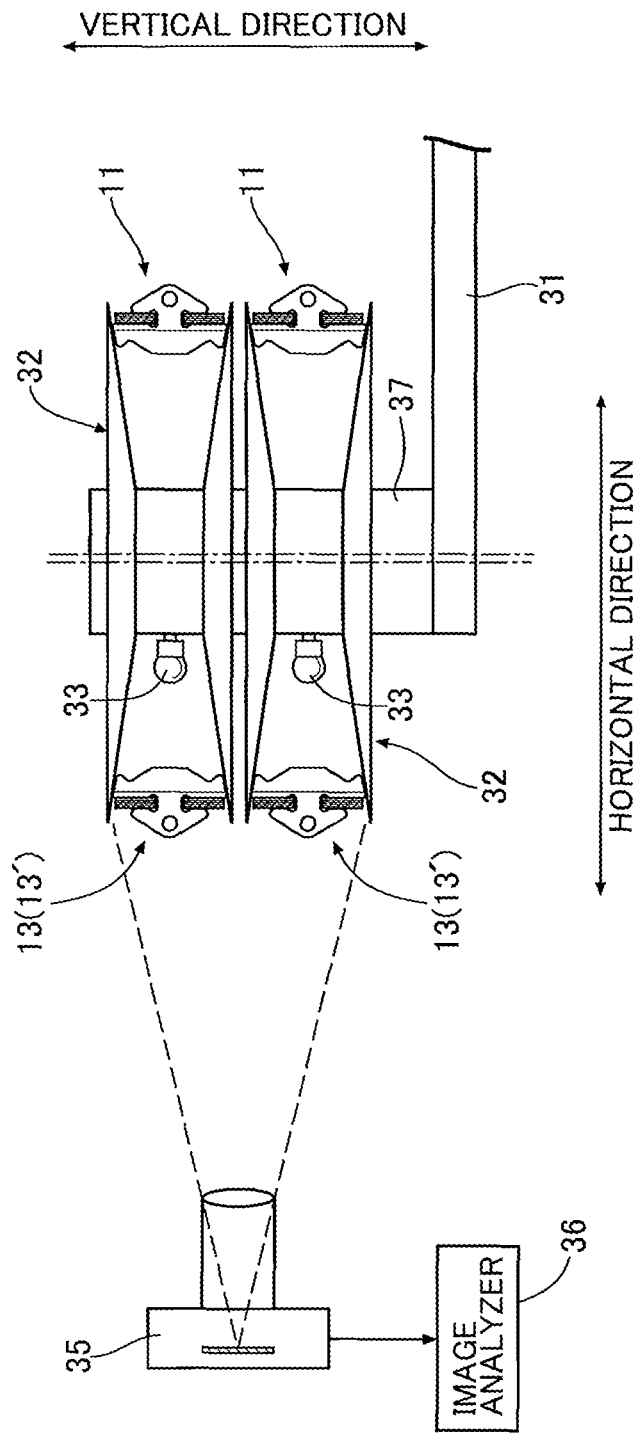
FIG. 8 is a side view of a metal element deformation state detection device. (third embodiment)

A third embodiment of the present invention is now explained by reference to FIG. 8.

The third embodiment carries out a test by disposing two dummy pulleys 32 and 32 on a rotating shaft 37 so as to be adjacent to each other and winding metal element rows 13' and 13' around the two dummy pulleys 32 and 32 respectively. Furthermore, the rotating shaft 37 of the dummy pulley 32 is vertically disposed, and the rows 13' of metal elements 13 move within a horizontal plane. In this process, since images of the two metal element rows 13' and 13' are taken by one imaging means 35, not only does the work efficiency improve because the two metal element rows 13' and 13' can be tested at the same time, but it becomes also possible to reduce the number of imaging means 35, thus reducing the equipment cost.

If a method is employed in which a deformed metal element 13 is found from areas of individual images of light in an image taken by the imaging means 35, it becomes possible to find which one of the two metal element rows 13' and 13' the deformed metal element 13 belongs to. On the other hand, a method in which the presence of a deformed metal element 13 is determined from the average illumination intensity of an image taken by the imaging means 35 cannot identify which one of the two metal element rows 13' and 13' the deformed metal element 13 belongs to. However, by precisely examining a predetermined area of the two metal element rows 13' and 13' appearing in the image where the illumination intensity exceeds a threshold value, the deformed metal element 13 can easily be found, thus eliminating the problem.

Furthermore, in the present embodiment, in the same manner as in the second embodiment, since the rotating shaft 37 of the dummy pulley 32 is vertically disposed and the metal element row 13' moves within the horizontal plane, the pair of metal ring assemblies 12 and 12 of the metal element row 13' are urged downwardly (one side in the width direction of the metal element 13) by virtue of gravity. As a result, the metal ring assembly 12 on the upper side is biased toward the inner side in the width direction of the metal element 13 and abuts against a neck part 17, and the metal ring assembly 12 on the lower side is biased toward the outer side in the width direction of the metal element 13 and abuts against a V groove 32b of the dummy pulley 32. This enables a gap occurring on the outer side in the width direction of the metal element 13 to be reliably detected above the metal ring assembly 12 on the upper side, and a gap occurring on the inner side in the width direction of the metal elements 13 to be reliably detected above the metal ring assembly 12 on the lower side, thereby enabling a gap to be reliably detected even if the position of the gap changes according to the deformation state of the metal elements 13.

Fourth Embodiment

Figure 9:
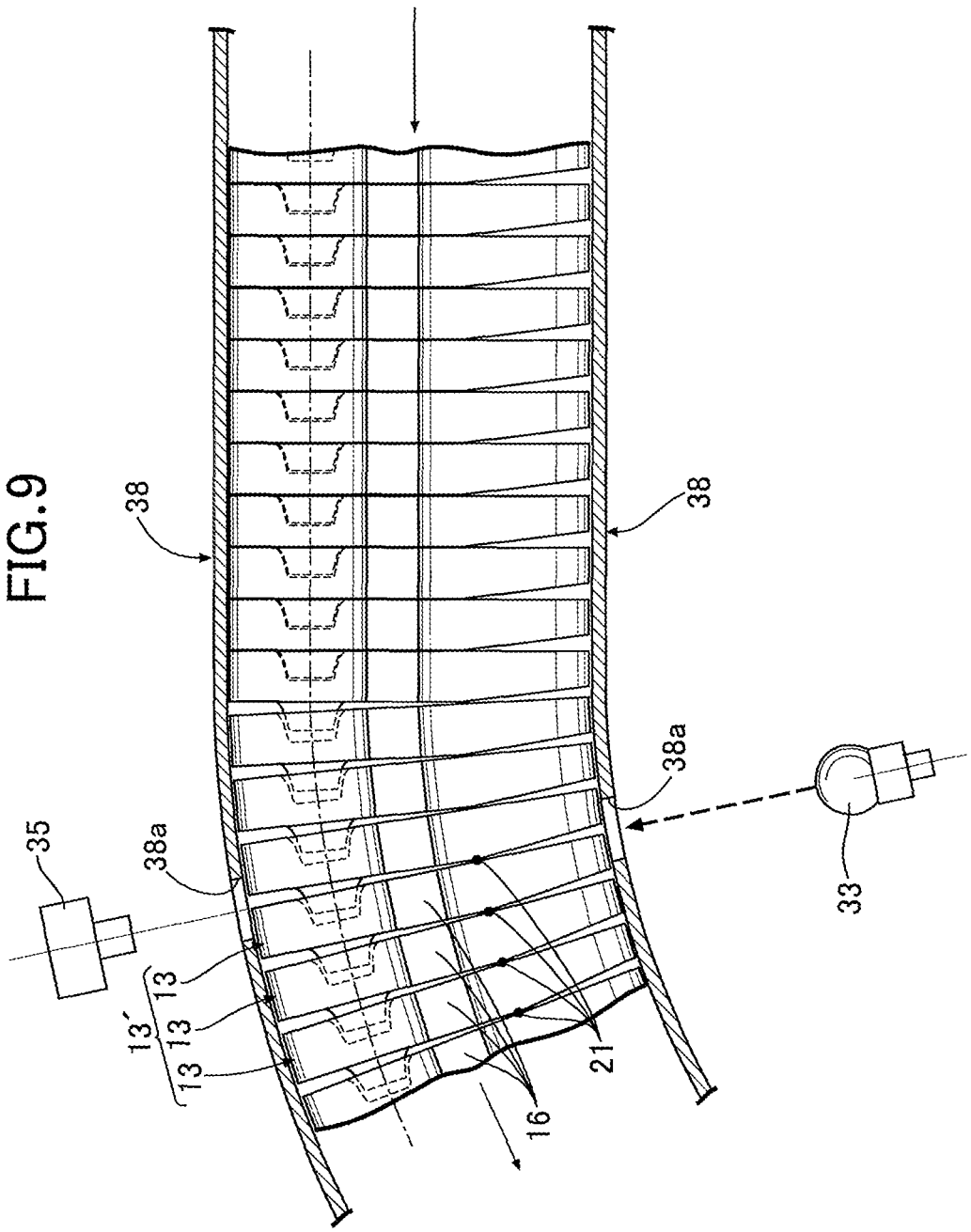
FIG. 9 is a plan view of a metal element deformation state detection device. (fourth embodiment)

A fourth embodiment of the present invention is now explained by reference to FIG. 9.

The first to third embodiments described above carry out a test in a state in which the metal element row 13' is supported on the pair of metal ring assemblies 12 and 12, that is, in a state in which the metal belt 11 is completed, but in the fourth embodiment the test is carried out in a state in which a metal element row 13' is formed only from metal elements 13.

That is, in a step of producing the metal elements 13, when a large number of metal elements 13 are aligned and transported in a state in which they are layered between a pair of guide rails 38 and 38, curving parts of the guide rails 38 and 38 into an arc shape forms a section in which metal elements 13 are aligned in an arc shape and in contact with each other at rocking edges 21. In this section, a light source 33 and imaging means 35 are disposed so that openings 38a and 38a formed in the guide rails 38 and 38 are interposed therebetween, and a deformed metal element 13 can be found by taking an image of light passing through a gap formed between the metal elements 13.

In accordance with the present embodiment, since the metal element row 13' does not have metal ring assemblies 12 and 12, it is possible to avoid a situation in which light passing through a gap is blocked by the metal ring assemblies 12 and 12, thus further enhancing the precision of detection.

Embodiments of the present invention are explained above, but the present invention may be modified in a variety of ways as long as the modifications do not depart from the spirit and scope thereof.

For example, in the embodiments the light source 33 is disposed on the inside in the direction of curvature of the metal element row 13', and the operator's eye 34 or the imaging means 35 is disposed on the outside in the direction of curvature of the metal element row 13', but the positional relationship may be reversed.

Furthermore, if a plurality of light sources 33 and a plurality of imaging means 35 are disposed for one metal element row 13', the time spent in taking images of one metal element row 13' can be reduced, thus enhancing the work efficiency.

Moreover, instead of testing the two metal element rows 13' at the same time by arranging the two dummy pulleys 32 and 32 side by side, three or more metal element rows 13' may be tested at the same time by arranging three or more dummy pulleys 32 side by side.

Furthermore, the imaging means 35 is not limited to the CCD camera of the embodiments.

The invention claimed is:

1. A metal element deformation state detection device for detecting a deformation state of a metal element forming a metal belt for a belt type continuously variable transmission, wherein
a plurality of the metal elements are in line contact with each other via a rocking edge and are aligned in an arc shape to form a metal element row, a light source is disposed on a radially inner side or a radially outer side of the arc of the metal element row, and a deformation state of the metal element is detected by observing passed-through light that has been emitted from the light source and has passed through a gap between the adjacent metal elements.

2. The metal element deformation state detection device according to claim 1, further comprising imaging means disposed on the opposite side of the metal element row to the light source so that the metal element row is interposed therebetween, and an image analyzer that analyzes an image of the passed-through light taken by the imaging means.

3. The metal element deformation state detection device according to claim 2, wherein the image analyzer detects a deformation state of the metal element based on the shape of an image of the passed-through light.

4. The metal element deformation state detection device according to claim 2, wherein the image analyzer detects a deformation state of the metal element based on an average illumination intensity of an image taken by the imaging means.

5. The metal element deformation state detection device according to claim 2, wherein an image of the passed-through light is taken by the imaging means while moving the metal element row wound around an outer periphery of a dummy pulley.

6. The metal element deformation state detection device according to claim 1, wherein the metal element row is formed by assembling a plurality of metal elements on a pair of metal ring assemblies.

7. The metal element deformation state detection device according to claim 6, wherein a deformation state of the metal element is detected while moving the metal element row within a horizontal plane.

8. The metal element deformation state detection device according to claim 1, wherein a deformation state of the metal element is detected while moving a plurality of the metal element rows arranged side by side.

* * * * *